R. POOLE.

Machine for Rubbing and Mixing Paints, Chemicals, &c.

No. 3,233. Reissued Dec. 15, 1868.

Witnesses
Jno. E. Patten
Thos. Chamberlain

Inventor
Robt Poole
Per A B Stoughton Atty

United States Patent Office.

ROBERT POOLE, OF BALTIMORE, MARYLAND.

*Letters Patent No.* 65,268, *dated May* 28, 1867; *reissue No.* 3,233, *dated December* 15, 1868.

IMPROVED MACHINE FOR RUBBING AND MIXING PAINTS, CHEMICALS, FERTILIZERS, &c.

The Schedule referred to in these Letters Patent and making part of the same.

*To all whom it may concern:*

Be it known that I, ROBERT POOLE, of Baltimore, in the county of Baltimore, and State of Maryland, have invented certain new and useful Improvements in Machines for Rubbing and Mixing Paints, Chemicals, Fertilizers, &c., and that the following is a full, clear, and exact description of the same, reference being had to the accompanying drawings, making a part of this specification, in which—

Figure 1:
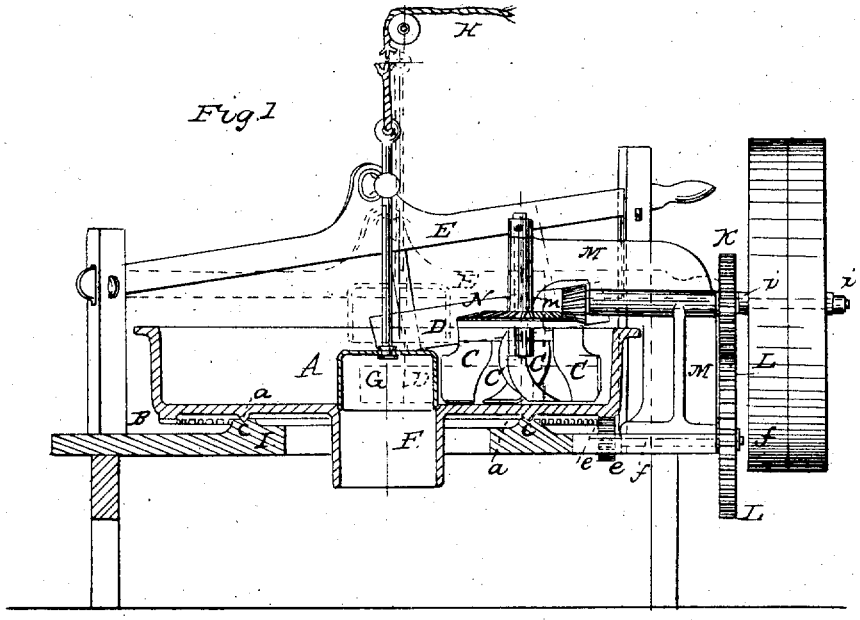
Figure 2:
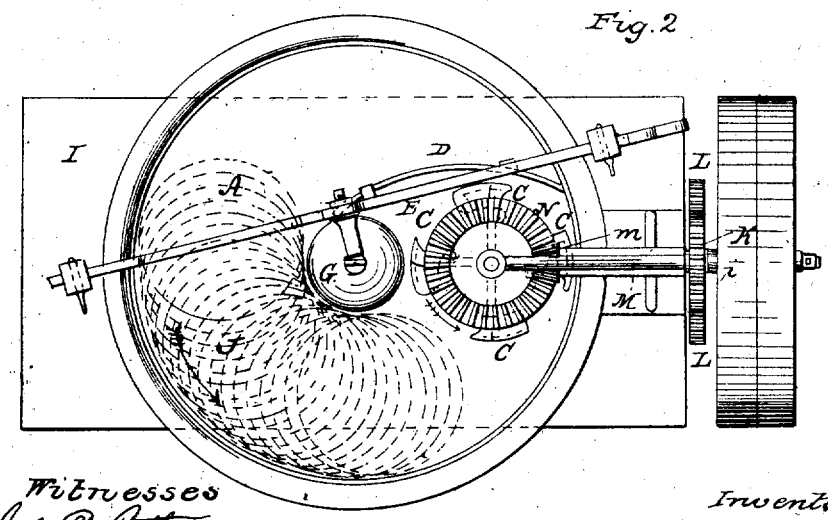

Figure 1 represents a vertical section, taken through the red line *x x* of fig. 2, and Figure 2 represents a top plan of the machine.

Similar letters of reference, where they occur in the separate figures, denote like parts of the machine in both of the drawings.

My invention consists, first, in combining, with a pan, tub, or other suitable holding-vessel, revolving horizontally on its support, a rubbing or mixing-apparatus, that turns about its support, within or over said pan, tub, or other holder, so that the united movements of the pan or holder, and of the rubbers or mixers, shall form or resemble a series of circular lines, that cut or cross each other, after the manner of "chased" or "lathe-work," as it is termed.

And my invention further consists in combining, with a pan, tub, or other suitable revolving holding-vessel, and the rubbing or mixing-apparatus, a guide or scraper, for turning and directing the material that is being rubbed or mixed, out of the path of the rubbers or mixers, when desired.

And my invention further consists in combining, with a revolving pan, tub, or other suitable receiver, and revolving rubbers and mixers, the guide and central discharge-opening, for removing the material acted upon by them from the pan or receiver.

To enable others skilled in the art to make and use my invention, I will proceed to describe the same, with reference to the drawings.

On a suitable base, I, the pan, basin, or other vessel, A, is arranged, so that it may be revolved, for which purpose a rib or circular projection, *a*, is made on the bottom of the pan, which rests and moves in a grooved way, *c*, on the base, I, which groove may contain oil, to cause the pan to run easily and truly, and with but little friction.

Around the edge of the bottom of the pan there is a circular rack, B, into which a bevel-gear, *e*, on the end of a shaft, *f*, takes, so as to rotate the pan or vessel.

The power to drive the machinery may be transmitted through a fast pulley on the shaft *i*, which moves said shaft, and from this shaft motion is communicated to the other moving-parts of the machine.

On this shaft *i* there is a gear, K, that meshes with and gives motion to a gear, L, on the shaft *f*, and consequently to said shaft also.

The shaft *i* and its gears are supported and turned in a bracket or arm, M, that projects over the perimeter of the tub far enough to receive, hold, and support the mixing, rubbing, or stirring-devices, as will be explained.

The shaft *i* has upon its end a bevel-pinion, *m*, that works in and turns a bevel-gear, N, on a vertical shaft, *n*, suspended in or to the arm or bracket M, so as to turn freely therein.

To the under side of the bevel-gear N is fastened, so that they will touch or nearly touch the bottom of the inside of the pan, a series of stirrers, mixers, or rubbers, C, that are carried around with said gear, or with its shaft, *n*, and these stirrers, mixers, or rubbers, may be of such shape and of such material as will best serve the special purpose for which the machine is to be used.

The red lines J show the path or lines in which these stirrers, mixers, or rubbers move on or over the bottom of the revolving pan, as it moves around on its supports. These lines J resemble what is termed "chased" or "lathe-work," and cross each other at such inclinations that the material to be operated upon is mixed in the most thorough manner, and not simply pushed apart without being mixed and thoroughly incorporated, as is often the case with a body moving through a mass of material. The comparative speed or motion of the pan or holder, and of the mixers or rubbers, regulates the distance at which these lines cross or cut each other.

When the material is sufficiently ground, rubbed, or mixed, the plug G is raised up out of the opening F, in the central part of the pan, by means of a rope, H, or otherwise, and the scraper or guide D, upon the hinged or pivoted lever E, is allowed to drop, so as to come down upon or close to the bottom of the pan. The pan and stirrers are kept in motion, and the material, as it is carried around by the pan, is, by the stirrers or rubbers C, thrown against the scraper D, which, as shown in fig. 2, is of a curved form, and extends, from near the perimeter of the pan, to the opening F, and it guides and directs the material thus brought up against it to the opening F, whence it drops through, and, by means of a pipe or trough, if liquid, or a conveyer, if solid, the mixed substance may be carried off to any suitable receptacle, and the pan recharged for another similar operation.

Having thus fully described my invention,

What I claim, in a machine for rubbing and mixing paints, chemicals, fertilizers, and other substances, is—

A pan, or other suitable holding-vessel, revolving around its support, and a series of rubbers or mixers in said pan or other vessel revolving around their, and a different central support, so that the combined movements of the receptacle, and of the rubbers or mixers, shall be in lines substantially such as shown and represented, and for the purpose specified.

Also, in combination with the revolving pan or other vessel, and rubbers or mixers, a scraper or guide, for moving the material operated upon out of the path of the rubbers or mixers, when desired, substantially as described.

Also, in combination with the revolving pan or other vessel, and the revolving rubbers or mixers, and guide or scraper, a discharge-opening, for removing the substance from the pan, by simply drawing the plug, and continuing the motion of the machine, substantially as described.

ROB'T POOLE.

Witnesses:
CHAS. W. WOOD,
GEO. SIMPSON.